United States Patent
Kamiya

[11] Patent Number: 5,886,981
[45] Date of Patent: Mar. 23, 1999

[54] CELL OUTPUT CONTENTION CONTROL APPARATUS FOR TRAFFIC SHAPER

[75] Inventor: Satoshi Kamiya, Tokyo, Japan

[73] Assignee: NEC Corporation, Tokyo, Japan

[21] Appl. No.: 837,102

[22] Filed: Apr. 14, 1997

[30] Foreign Application Priority Data

Apr. 15, 1996 [JP] Japan .................................. 8-092543

[51] Int. Cl.$^6$ .................................................. H04L 12/56
[52] U.S. Cl. ...................... 370/230; 370/417; 395/200.64
[58] Field of Search .................................... 370/230, 232, 370/235, 417, 458, 468, 395, 516, 517; 395/200.64

[56] References Cited

U.S. PATENT DOCUMENTS

| | | | |
|---|---|---|---|
| 5,535,201 | 7/1996 | Zheng | 370/412 |
| 5,579,302 | 11/1996 | Banks | 370/397 |
| 5,579,312 | 11/1996 | Regache | 370/397 |
| 5,640,389 | 6/1997 | Masaki et al. | 370/418 |
| 5,719,865 | 2/1998 | Sato | 370/428 |
| 5,724,513 | 3/1998 | Ben-Nun et al. | 395/200.64 |
| 5,745,477 | 4/1998 | Zheng et al. | 370/230 |

OTHER PUBLICATIONS

Boyer et al., "Spacing Cells Protects and Enhances Utilization of ATM Network Links", IEEE Network vol. 6, No. 9, pp. 38–49, Sep. 1992.

*Primary Examiner*—Min Jung
*Attorney, Agent, or Firm*—Foley & Lardner

[57] ABSTRACT

A cell output contention control apparatus for a traffic shaper includes an arrival order ring buffer, a transmission order ring buffer, time slots, and determining units. The arrival order ring buffer includes non-storage cell slots in which cells or addresses thereof are stored in the order in which the cells arrive, and ideal transmission time slots correlated with the first slots and used to store the ideal transmission times of the cells. The transmission order ring buffer includes transmission cell slots in which cells to be transmitted at the respective actual transmission times sequentially assigned to the slots in advance or addresses of the cells are stored. Each time slot consists of a set of non-storage cell and ideal transmission time slots of the arrival order ring buffer and one of the transmission cell slots of the transmission order ring buffer such that a combination of the first and second slots is changed at least once within a 1-cell time. The determining units are arranged for the respective time slots to determine whether predetermined storage conditions including an ideal transmission time of a cell are satisfied, and transfer the cell stored in the non-storage cell slot to the transmission cell slot to store the cell therein when the storage conditions are satisfied.

11 Claims, 9 Drawing Sheets

CELL OUTPUT CONTENTION CONTROL APPARATUS FOR TRAFFIC SHAPER

BACKGROUND OF THE INVENTION

The present invention relates to a cell output contention control apparatus for a traffic shaper and, more particularly, to a traffic shaper cell output contention control apparatus used to output cells onto virtual paths or channels set on an ATM (Asynchronous Transfer Mode) transmission line by a traffic shaper while averaging transmission intervals.

In an ATM network, when cells are to be output to a plurality of virtual paths or channels multiplexed on a transmission line, a traffic with high burstiness is generally input. Even in this case, a traffic shaper is used to average cell transmission intervals with respect to one virtual path or channel so as to prevent the number of cells to be transmitted from exceeding the transmission capacity of each virtual path or channel.

This traffic shaper determines the ideal transmission time of each arrival cell on the basis of a predetermined algorithm such that the cell transmission intervals become equal intervals. Cells are temporarily stored in a delaying cell memory (buffer), and the respective cells are sequentially transmitted at the corresponding transmission times. As a method of managing the transmission order of cells, a method of assigning actual transmission times to the respective time slots of the memory is available.

In this method, cells or their addresses of the cell memory are stored in the time slots of the memory which have the same transmission times as the ideal transmission times of the respective cells, the cell or its storage address stored in the time slot corresponding to the current time is sequentially read out, and the cell or the cell stored at the cell storage address is transmitted, thereby managing the cell transmission order.

According to this method, if the same ideal transmission times are calculated with respect to a plurality of cells which have arrived at different times, the ideal transmission time of a cell which has arrived at a given time may contend against that of a cell which had already arrived (in the past). In addition, if the actual transmission time of a given cell is changed to a time different from the ideal transmission time by cell transmission contention control, the ideal transmission time of a cell which has arrived at the given time may contend against the actual transmission time of the cell which had already arrived (in the past).

If such contention occurs, cell output contention control needs to be performed. For example, the actual transmission time of a cell which has arrived later is delayed (in the future) with respect to the ideal transmission time of the cell.

As such a control method, a conventional cell output contention control method has been proposed (for example, "Spacing Cells Protects and Enhances Utilization of ATM Network Links", IEEE Network, pp. 38–49, September, 1992), in which when output contention occurs with respect to a time slot corresponding to the ideal transmission time of an arrival cell, an available time slot which is later than the time slot indicated by the ideal transmission time and is not used is searched out, and the arrival cell or its address is stored in the found available time slot.

This output contention control method uses an available time slot search method in which a time slot corresponding to the ideal transmission time of an arrival cell is set as a search start slot, and the use states of the respective time slots are sequentially checked in the direction of the future, starting from the search start slot, until an available time slot is searched out because of the necessity to hold the cell transmission order on a single virtual path or channel.

In the output contention control apparatus for such a conventional traffic shaper, however, since time slots are sequentially searched from a search start slot in the direction of the future to search out an available time slot in which an arrival cell is to be stored, the use states of all the time slots to be searched cannot be checked within a 1-cell time until the next cell arrives, provided that a cell transmission rate is high or a transmission order management memory has a large capacity.

If the available time slot search range is limited in accordance with the transmission rate of cells, the capacity of the transmission order management memory is limited. As a result, no available time slot may be found, and a cell loss may occur.

SUMMARY OF THE INVENTION

It is an object of the present invention to provide a traffic shaper cell output contention control apparatus which can reliably search for an available time slot corresponding to an arrival cell regardless of the transmission rate of cells and the capacity of a transmission order management memory.

In order to achieve the above object, according to the present invention, there is provided a cell output contention control apparatus for a traffic shaper, comprising a first ring buffer including a plurality of first slots in which cells or cell storage addresses thereof are stored in an order in which the cells arrive, and a plurality of second slots which are correlated with the first slots and used to store ideal transmission times of the cells, a second buffer including a plurality of third slots in which cells to be transmitted at the respective actual transmission times sequentially assigned to the slots in advance or cell storage addresses of the cells are stored, a plurality of time slots each constituted by a set of the first and second slots of the first ring buffer and one of the third slots of the second ring buffer such that a combination of the first and second slots is changed at least once within a 1-cell time, and a plurality of determining means, arranged in correspondence with the respective time slots, for determining whether predetermined storage conditions including an ideal transmission time of a cell are satisfied, and transferring the cell stored in the first slot to the third slot to store the cell therein when the storage conditions are satisfied.

DESCRIPTION OF THE PREFERRED EMBODIMENTS

The present invention will be described in detail below with reference to the accompanying drawings.

Figure 1:
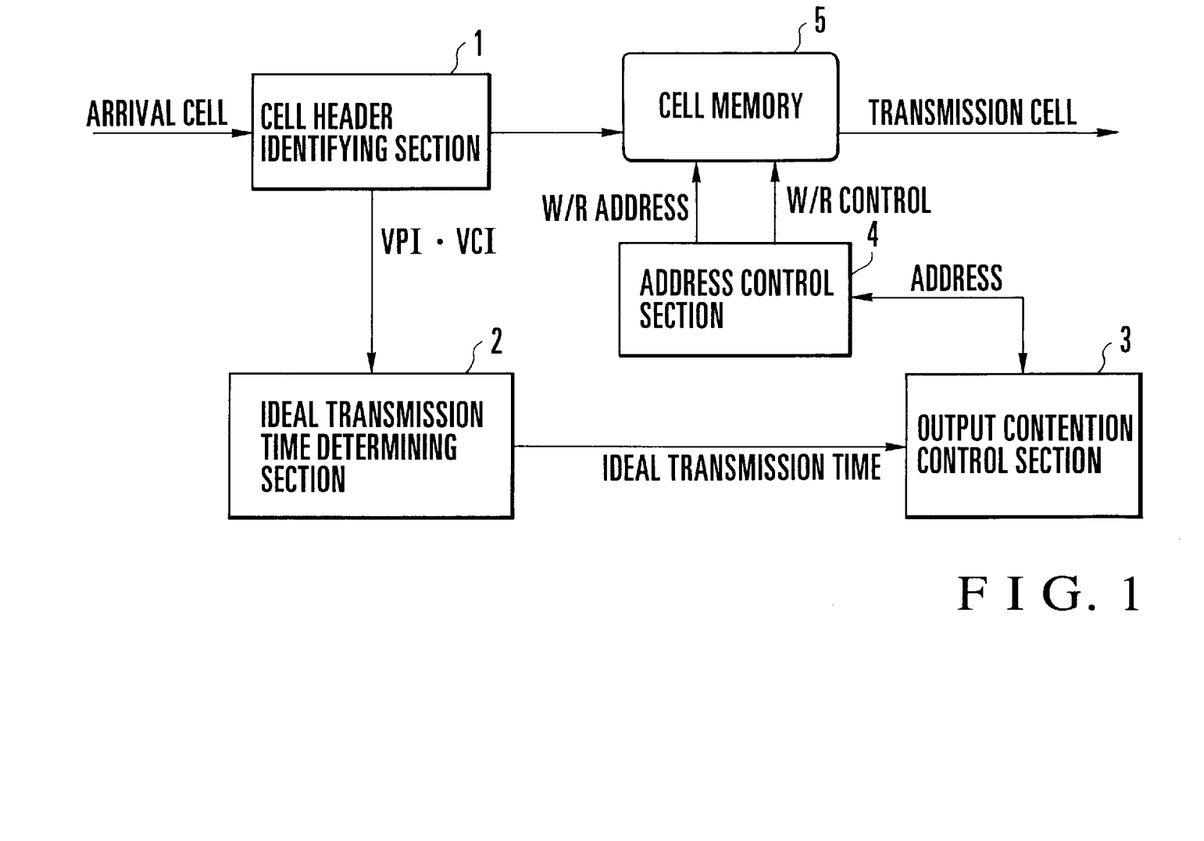
FIG. 1 is a block diagram showing a traffic shaper to which the present invention is applied.

FIG. 1 shows a traffic shaper applied to the present invention. Referring to FIG. 1, reference numeral 1 denotes a cell header identifying section for identifying a virtual path identifier (VPI) and a virtual channel identifier (VCI) added to the header of an arrival cell; and 2, an ideal transmission time determining section for determining the ideal transmission times of arrival cells according to a predetermined algorithm to average the cell transmission intervals.

Reference numeral 3 denotes an output contention control section for performing cell output contention control on the basis of the ideal transmission times of arrival cells which are determined by the ideal transmission time determining section 2; 4, an address control section for outputting predetermined write/read (W/R) address information and write/read control information on the basis of the control information output from the output contention control section 3; and 5, a cell memory for storing arrival cells from the cell header identifying section 1 and outputting transmission cells on the basis of the W/R address information and W/R control information from the address control section 4.

Figure 2:
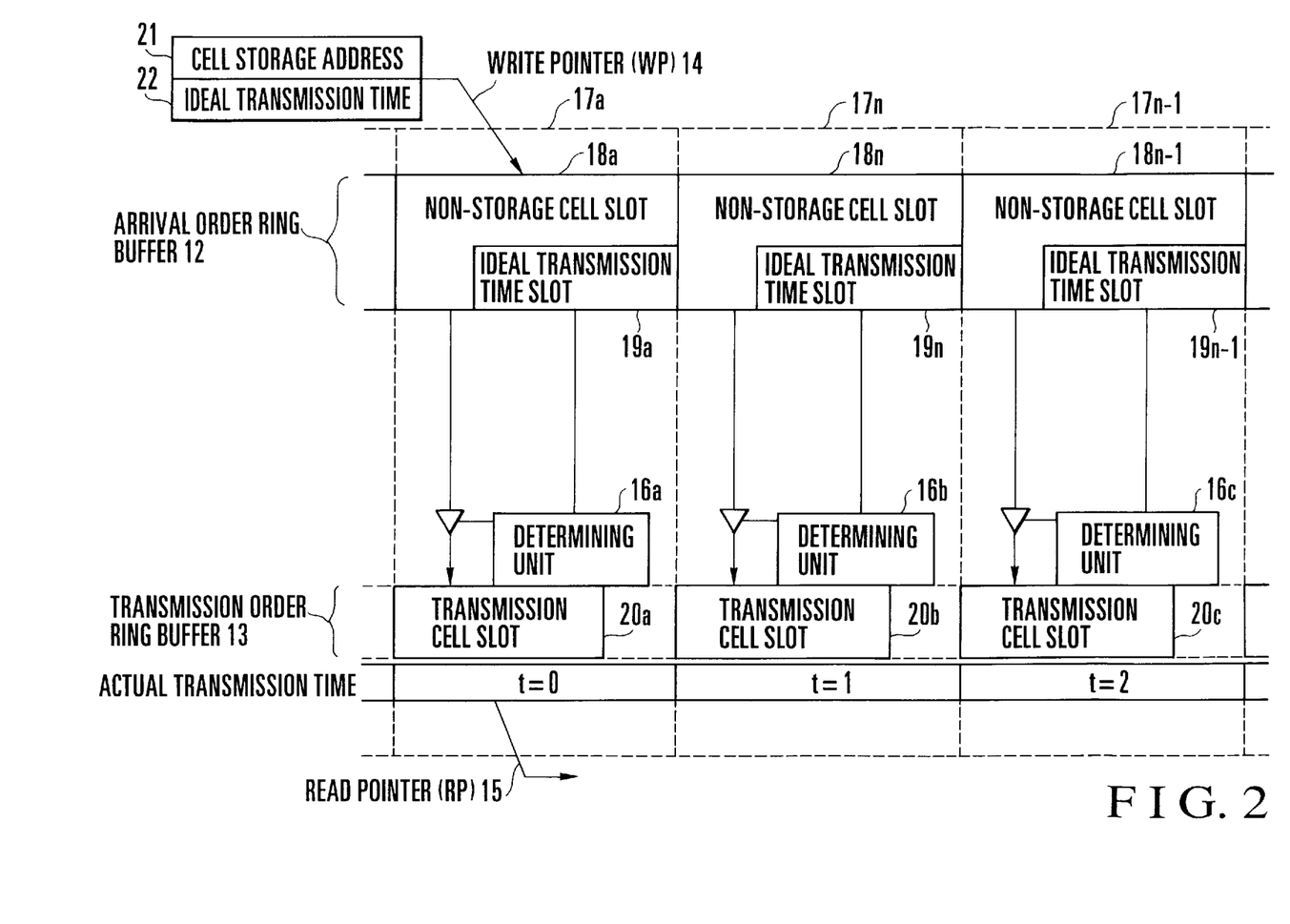
FIG. 2 is a block diagram showing the main part of an output contention control section according to the first embodiment of the present invention.

FIG. 2 shows the main part of the output contention control section 3 in the first embodiment of the present invention. The output contention control section 3 has two ring buffers, i.e., an arrival order ring buffer 12 and a transmission order ring buffer 13. The arrival order ring buffer 12 is constituted by n (n is a positive integer) non-storage cell slots 18a to 18n for storing the addresses of arrival cells stored in the cell memory 5, and ideal transmission time slots 19a to 19n which are paired with the non-storage cell slots 18a to 18n and used to store the ideal transmission times assigned to the respective arrival cells. Reference numeral 14 denotes a write pointer (WP) for indicating a predetermined one of the non-storage cell slots 18a to 18n and a predetermined one of the ideal transmission time slots 19a to 19n of the arrival order ring buffer 12 as the storage locations of an address 21 in the cell memory 5 at which an arrival cell is stored and an ideal transmission time 22 assigned to the address 21.

The transmission order ring buffer 13 is constituted by n transmission cell slots 20a to 20n for storing the addresses of transmission cells stored in the cell memory 5; and 15, a read pointer (RP) for indicating a predetermined one of the transmission cell slots 20a to 20n of the transmission order ring buffer 13 as a location from which the address of a transmission cell 23 stored in the cell memory 5 is to be read out. Actual transmission times are fixedly and sequentially assigned, as cell transmission timings, to the transmission cell slots 20a to 20n, in particular, and cell transmission order management is performed by the read pointer 15 and the transmission order ring buffer 13.

Reference numerals 16a to 16n denote n determining units arranged in correspondence with the respective transmission cell slots 20a to 20n of the transmission order ring buffer 13; and 17a to 17n, time slots constituted by pairs of the non-storage cell slots 18a to 18n and the ideal transmission time slots 19a to 19n of the arrival order ring buffer 12, the transmission cell slots 20a to 20n of the transmission order ring buffer 13, and the determining units 16a to 16n.

In the respective time slots, the determining units 16a to 16n compare the actual transmission times of the time slots with the ideal transmission time slots 19a to 19n on the basis of a predetermined determination criterion, thus performing storage determination processing. In accordance with the comparison results, it is determined whether the addresses stored in the non-storage cell slots 18a to 18n are stored in the transmission cell slots 20a to 20n. Such storage determination processing is performed independently and concurrently in the respective time slots.

The operation of the output contention control section having the above arrangement will be described next with reference to FIGS. 3A and 3B and 4A to 4H. The output contention control section 3 starts output contention control like the one shown in FIG. 3A in accordance with the timing at which a new cell arrives. Assume that the non-storage cell slots 18a, 18n, 18n–1, . . . , and the ideal transmission time slots 19a, 19n, 19n–1, . . . , of the arrival order ring buffer 12 and the transmission cell slots 20a, 20b, 20c, . . . of the transmission order ring buffer 13 respectively constitute n time slots 17a, 17b, 17c, . . . , as shown in FIGS. 4A to 4H.

In this case, the respective time slots 17a to 17n are arranged such that the non-storage cell slot 18a and the ideal transmission time slot 19a which are indicated by the write pointer 14 and the transmission cell slot 20a indicated by the read pointer 15 constitute the same time slot. The actual transmission times of the time slots 17a to 17n are given by t=0 to n−1. Assume that a cell "C1" is stored in the transmission cell slot 20b with actual transmission time t=1, a cell "C2" is stored in the transmission cell slot 20c with actual transmission time t=2, and the remaining transmission cell slots 20a and 20d to 20n are "available".

Figures 3A, 3B:
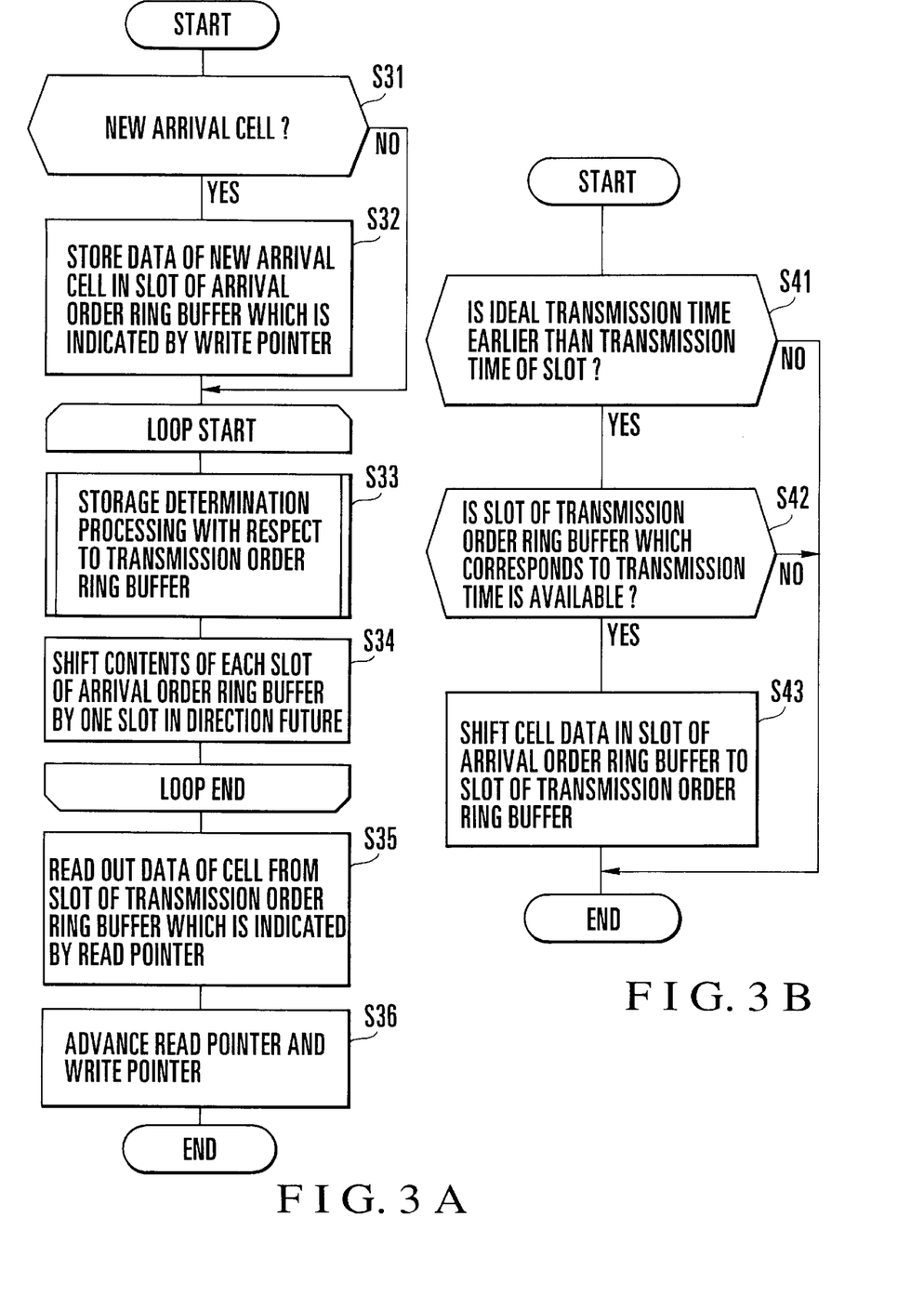
FIG. 3A is a flow chart showing the operation of the output contention control section in FIG. 1.
FIG. 3B is a flow chart showing storage determination processing in FIG. 3A in detail.
Figure 4A:
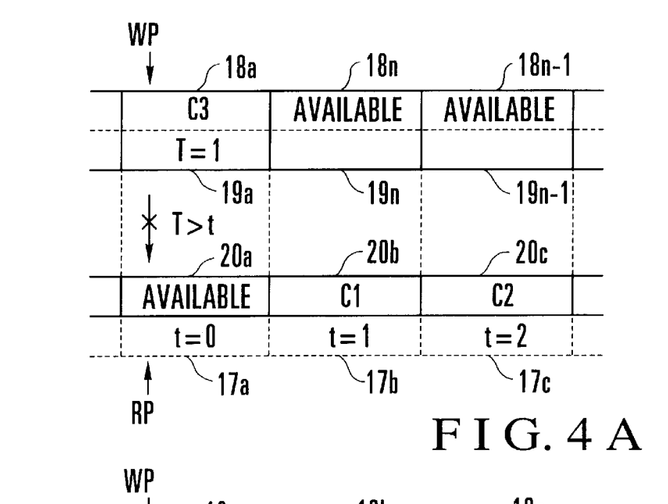
FIGS. 4A to 4H are views for explaining an output contention operation in the first embodiment.

Referring to FIG. 3A, the output contention control section 3 checks whether a new cell has arrived (step S31). If YES in step S31, the output contention control section 3 stores the address of a new arrival cell "C3" stored in the cell memory 5, which is notified by the address control section 4, and the ideal transmission time (T=1) assigned to the new arrival cell in predetermined slots of the arrival order ring buffer 12 which are indicated by the write pointer (WP) 14 (the non-storage cell slot 18a and the ideal transmission time slot 19a in this case), as shown in FIG. 4A (step S32).

If NO in step S31, the output contention control section 3 determines that an available cell has arrived, and sets the non-storage cell slot 18a and the ideal transmission time slot 19a indicated by the write pointer (WP) 14 to be "available". The determining units 16a to 16n concurrently perform storage determination processing with respect to the transmission order ring buffer 13 in the respective time slots 17a to 17n (step S33).

This storage determination processing will be described in detail with reference to the flow chart of FIG. 3B. In the time slot 17a, the determining unit 16a compares the ideal transmission time T=1 of the arrival cell "C3" stored in the ideal transmission time slot 19a with the actual transmission time t=0 assigned to the time slot 17a (step S41). If the ideal transmission time T is equal to or earlier than the actual transmission time t (T≦t), it is checked whether the transmission cell slot 20a is available (step S42).

If it is determined in step S42 that the transmission cell slot 20a is available, the contents of the non-storage cell slot 18a, i.e., the address of the new arrival cell "C3" stored in the cell memory 5, are transferred to the transmission cell slot 20a (step S43). The processing is then terminated. If it is determined in step S41 that the ideal transmission time T is later than the actual transmission time t (T>t), or it is determined in step S42 that the transmission cell slot 20a is not available, as shown in FIG. 4A, the processing is terminated.

Figure 4B:
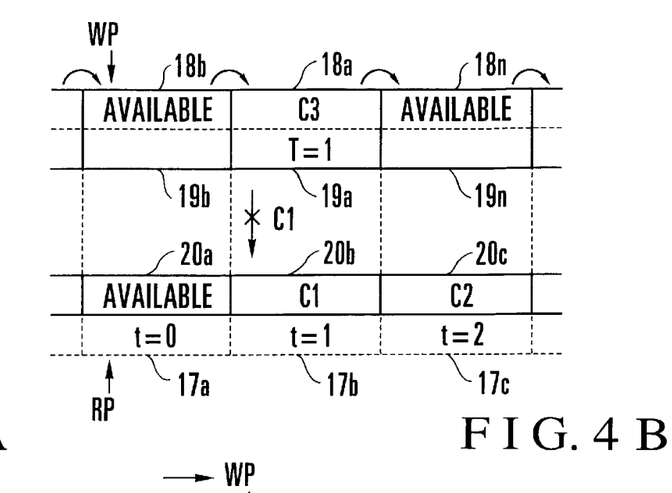

As described above, in step S33, the determining units 16a to 16n concurrently perform storage determination processing with respect to the transmission order ring buffer 13 in the respective time slots 17a to 17n. Subsequently, as shown in FIG. 4B, all the non-storage cell slots 18a to 18n and the ideal transmission time slots 19a to 19n of the arrival order ring buffer 12 are shifted by one slot in the direction of the future of the transmission order ring buffer 13 (step S34).

The storage determination processing with respect to the transmission order ring buffer 13 in step S33 and the slot shift operation of the arrival order ring buffer 12 in step S34 are repeatedly executed twice within a 1-cell time until the next arrival cell arrives in accordance with "loop start" and "loop end". As shown in FIG. 4B, therefore, the new time slots 17a, 17b, 17c, . . . are constituted by the non-storage cell slots 18b, 18a, 18n, . . . , the ideal transmission time slots 19b, 19a, 19n, . . . , and the transmission cell slots 20a, 20b, 20c, . . . by the first slot shift operation of the arrival order ring buffer 12.

In these time slots 17a to 17n, storage determination processing with respect to the transmission order ring buffer 13 is concurrently executed. In this case, in the time slot 17b, the ideal transmission time T=1 of the arrival cell "C3" stored in the ideal transmission time slot 19a is equal to the actual transmission time t=1 assigned to the time slot 17b. However, since the cell "C1" is stored in the transmission cell slot 20b, the cell "C3" is not transferred from the non-storage cell slot 18a to the transmission cell slot 20b but is kept in the non-storage cell slot 18a.

Figure 4C:
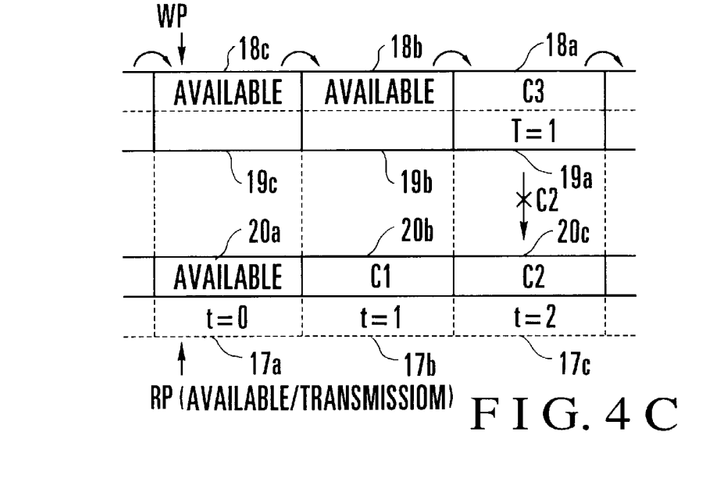

Subsequently, as shown in FIG. 4C, the second slot shift operation of the arrival order ring buffer 12 is executed, so that the new time slots 17a, 17b, 17c, . . . are constituted by the non-storage cell slots 18c, 18b, 18a, . . . , the ideal transmission time slots 19c, 19b, 19a, . . . , and the transmission cell slots 20a, 20b, 20c, . . . In the concurrent storage determination processing in the new time slots 17a, 17b, 17c, . . . , since the cell "C2" is stored in the transmission cell slot 20c, no cell is transferred from the non-storage cell slot 18a to the transmission cell slot 20c.

When the current time becomes the actual transmission time t=0 afterward, the address of the arrival cell stored in the cell memory 5 is read out from the transmission cell slot 20a of the transmission order ring buffer 13 which is indicated by the read pointer (RP) 15 (step S35). The output contention control section 3 notifies the address control section 4 of the readout address. The arrival cell stored at the address is read out as a transmission cell from the cell memory 5. Referring to FIG. 4C, since the transmission cell slot 20a indicated by the read pointer 15 is "available", an "available cell" is transmitted at the actual transmission time t=0.

Figure 4D:
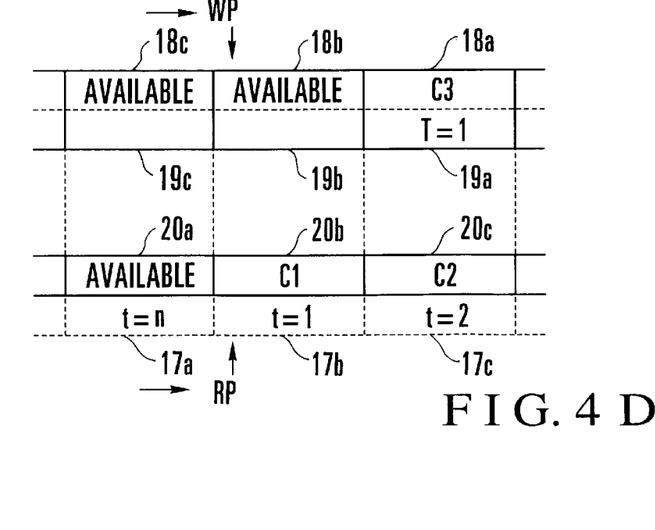

Finally, as shown in FIG. 4D, the write pointer (WP) 14 and the read pointer (RP) 15 are advanced by one slot in the direction of the future (step S36). In addition, the actual transmission time of the transmission cell slot 20 which the read pointer (RP) 15 has passed is set to the last time slot t=n of the transmission order ring buffer 13, and the output contention control processing for the new arrival cell "C3" is terminated.

The output contention control section 3 therefore includes a storage means having the function of step S32, the determining units 16a to 16n as storage determination processing means having the function of step S33, a shift means having the function of step S34, and a read means having the function of step S35.

When the arrival cells kept in the non-storage cell slots 18a to 18n of the arrival order ring buffer 12 contend against the preceding cells shown in FIGS. 4A to 4D, output contention control processing for the next arrival cell is performed. The above arrival cells and the next arrival cell are concurrently subjected to storage determination with respect to the arrival order ring buffer 12.

Figure 4E:
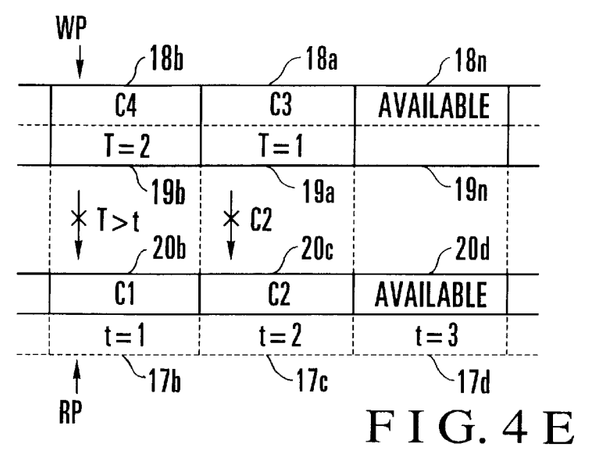

More specifically, as shown in FIG. 4E, a next arrival cell "C4" is input, following the cell "C3", and the cell "C4" and its ideal transmission time T are respectively stored in the non-storage cell slot 18b and the ideal transmission time slot 19b which are indicated by the write pointer (WP) 14. Thereafter, the determining units 16a to 16n concurrently perform storage determination processing with respect to the arrival order ring buffer 12 in the respective time slots 17a to 17n.

With this storage determination processing, in the time slot 17c, the cell "C3" kept in the non-storage cell slot 18a of the arrival order ring buffer 12 is subjected to storage determination in the preceding output contention control processing. In this case, since the cell "C2" is stored in the transmission cell slot 20c constituting the time slot 17c, no cell is transferred from the non-storage cell slot 18a to the transmission cell slot 20b.

Note that the cell "C4" in the time slot 17b is not transferred to the transmission cell slot 20b because the ideal transmission time T>actual transmission time t.

Figure 4F:
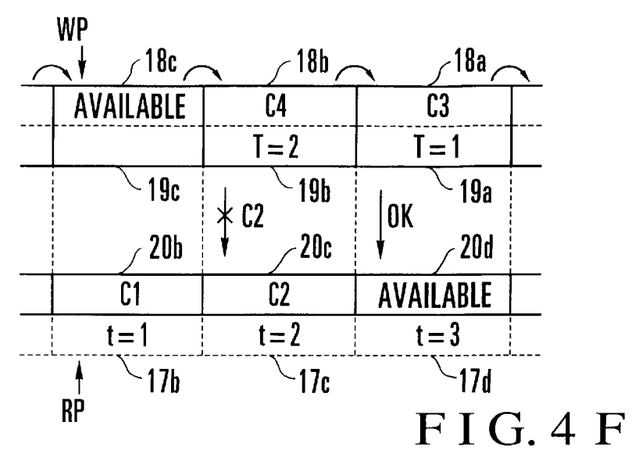

Subsequently, as shown in FIG. 4F, the first slot shift operation of the arrival order ring buffer 12 is performed to constitute the new time slots 17a to 17n. In the respective time slots 17a to 17n, storage determination with respect to the arrival order ring buffer 12 is concurrently performed. In this case, in the time slot 17d, the ideal transmission time T=1 of the cell "C3" is earlier than the actual transmission time t=3 of the time slot 17d, and the transmission cell slot 20d is "available". For this reason, the contents of the non-storage cell slot 18a, i.e., the storage address of the cell "C3", are transferred to the transmission cell slot 20d.

Note that since the cell "C2" is stored in the transmission cell slot 20c, the cell "C4" in the time slot 17c is not transferred to the transmission cell slot 20c.

Figure 4G:
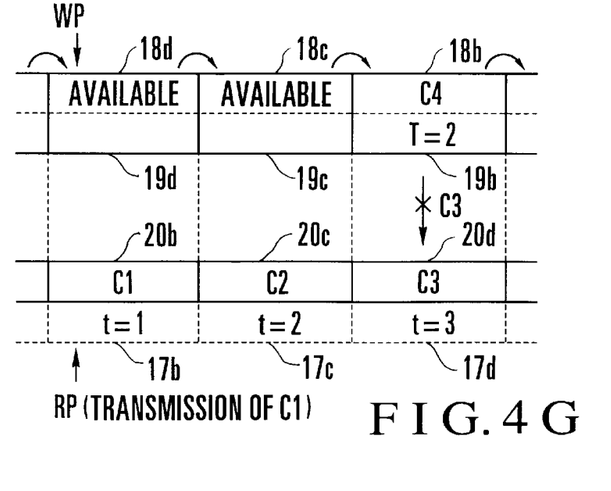

As shown in FIG. 4G, the second slot shift operation of the arrival order ring buffer 12 is performed to constitute the new time slots 17a to 17n. In this case, since the cell "C3" is stored in the transmission cell slot 20d constituting the time slot 17d, the cell "C4" is not transferred to the transmission cell slot 20d.

When the current time becomes the actual transmission time t=1 afterward, the address of the cell "C1" stored in the cell memory 5 is read out from the transmission cell slot 20b of the transmission order ring buffer 13 which is indicated by the read pointer (RP) 15. The address control section 4 is then notified of this address. The cell "C1" stored at this address is read out as a transmission cell from the cell memory 5.

Figure 4H:
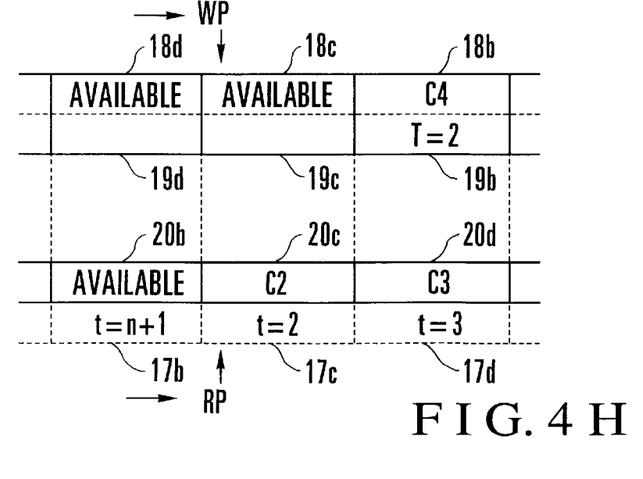

Finally, as shown in FIG. 4H, the write pointer (WP) 14 and the read pointer (RP) 15 are advanced by one slot in the direction of the future. In addition, the actual transmission time of the transmission cell slot 20b which the read pointer (RP) 15 has passed is set to the last time slot t=n+1 of the transmission order ring buffer 13, and the output contention control processing in accordance with the input of the cell "C4" is terminated.

Referring to FIGS. 4E to 4F, therefore, storage determination processing for the arrival cell "C4" with respect to the transmission order ring buffer 13 and storage determination processing for the cell "C3" input before the arrival cell "C4" and kept in the arrival order ring buffer 12 are concurrently performed.

As described above, according to this embodiment, the output contention control section 3 includes the arrival order ring buffer 12, which holds the storage addresses of arrival cells and the ideal transmission times T of the respective arrival cells in the non-storage cell slots 18a to 18n and the ideal transmission time slots 19a to 19n in the cell arrival order, and the transmission order ring buffer 13, which holds the storage addresses of cells to be transmitted at actual transmission times in the transmission cell slots 20a to 20n to which the actual transmission times are assigned. With this arrangement, the time slots 17a to 17n are respectively constituted by the non-storage cell slots 18a to 18n, the ideal transmission time slots 19a to 19n, and the transmission cell slots 20a to 20n. In the respective time slots 17a to 17n, storage determination processing with respect to the transmission order ring buffer 13 is concurrently executed. That is, in each time slot, only when a corresponding one of the determining units 16a to 16n performs a determining operation to determine that a predetermined condition is satisfied, the contents of the non-storage cell slot 18 are transferred to the transmission cell slot 20.

In this case, the arrival order ring buffer 12 is shifted twice within a 1-cell time, and the write pointer (WP) 14 is advanced by one time slot in the shift direction of the arrival order ring buffer 12. As a result, arrival cells are consecutively stored in the arrival order ring buffer 12.

Even if, therefore, the transmission rate of cells is high or the capacity of a transmission order management buffer is large, the search range within a 1-cell time between the arrival of a given cell and the arrival of the next cell can be greatly narrowed, and an available time slot corresponding to an arrival cell can be reliably searched out regardless of the transmission rates of cells and the capacity of the transmission order management buffer, unlike the prior art in which time slots are sequentially searched in the direction of the future, starting from a predetermined search start slot, to find an available slot in which an arrival cell is to be stored.

In addition, in the respective time slots 17a to 17n, the ideal transmission times T stored in the ideal transmission time slots 19a to 19n are compared with the actual transmission times t of the transmission cell slots 20a to 20n. When the ideal transmission time T is equal to or earlier than the actual transmission time t and one of the transmission cell slots 20a to 20n is available, the contents of the corresponding one of the non-storage cell slots 18a to 18n are transferred to the corresponding one of the transmission cell slots 20a to 20n. With this operation, the respective cells can be accurately transmitted on the basis of the order of the ideal transmission times T assigned to the respective arrival cells.

Furthermore, a time slot constituted by a non-storage cell slot in which a new arrival cell is stored, a corresponding ideal transmission time slot, and a transmission cell slot corresponding to the next actual transmission time of a cell is used as a reference, and time slots are sequentially constituted by non-storage cell slots earlier than the reference time slot, the corresponding ideal transmission time slots, and transmission cell slots later than the reference time slot.

With this operation, when the transmission cell slot corresponding to the next actual transmission time of a cell is available, and the ideal transmission time of a new arrival cell is equal to or earlier than the actual transmission time, the new arrival cell can be immediately transmitted at the next actual transmission time. Therefore, processing response to the new arrival cell can be quickly performed, and the number of queued arrival cells can be reduced.

Figure 5:
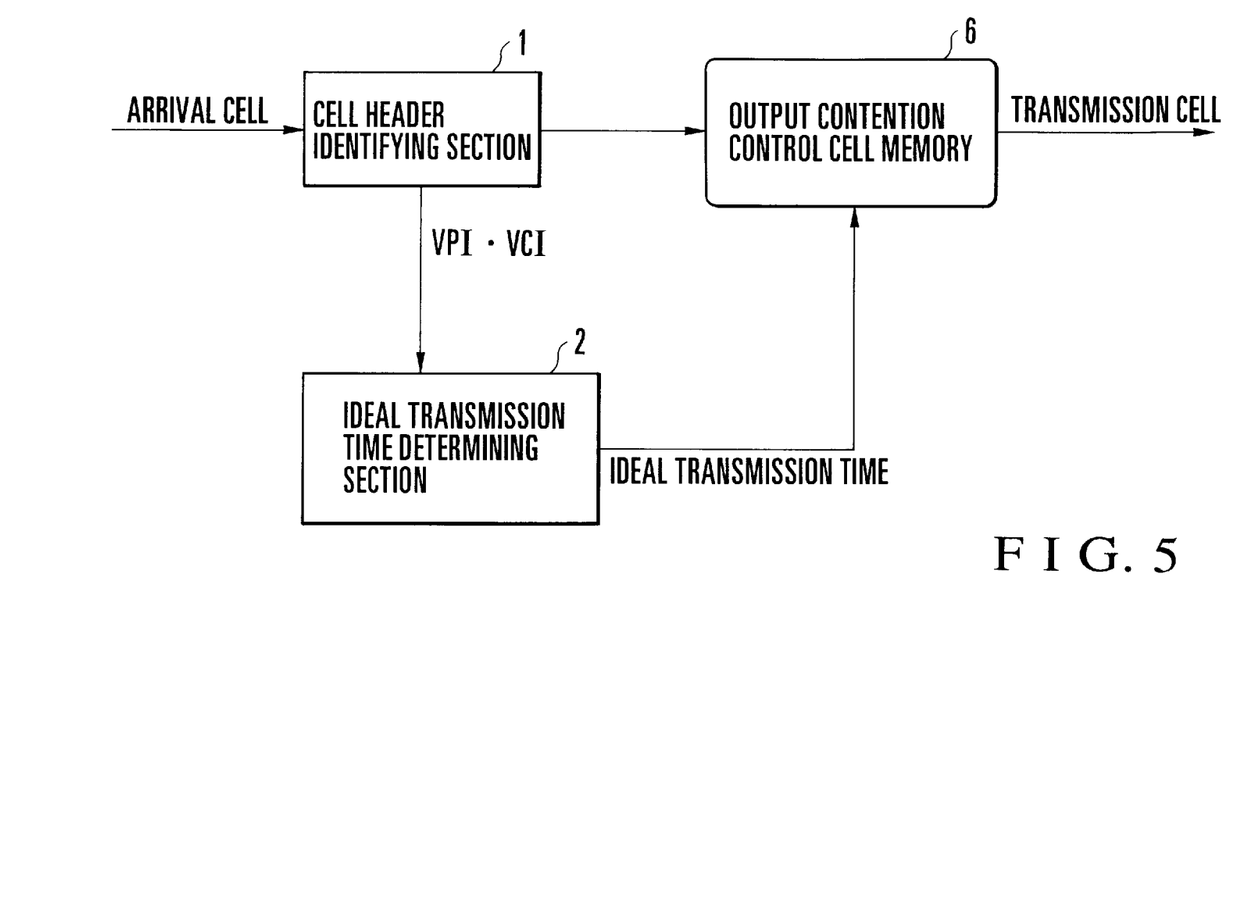
FIG. 5 is a block diagram showing another traffic shaper to which the present invention is applied.

According to the above description, the storage addresses of arrival cells in the cell memory 5 are stored in the arrival order ring buffer 12 and the transmission order ring buffer 13. However, the present invention is not limited to this. For example, the contents of arrival cells themselves may be stored in the respective ring buffers 12 and 13. In this case, as shown in FIG. 5, the traffic shaper does not require the address control section 4, and includes an output contention control cell memory 6 in place of the cell memory 5. The output contention control cell memory 6 includes an arrival order ring buffer for temporarily storing arrival cells together with their ideal transmission times, and a transmission order ring buffer to which the cells stored in the arrival order ring buffer are transferred, together with the ideal transmission times, by output contention control.

Figure 6:
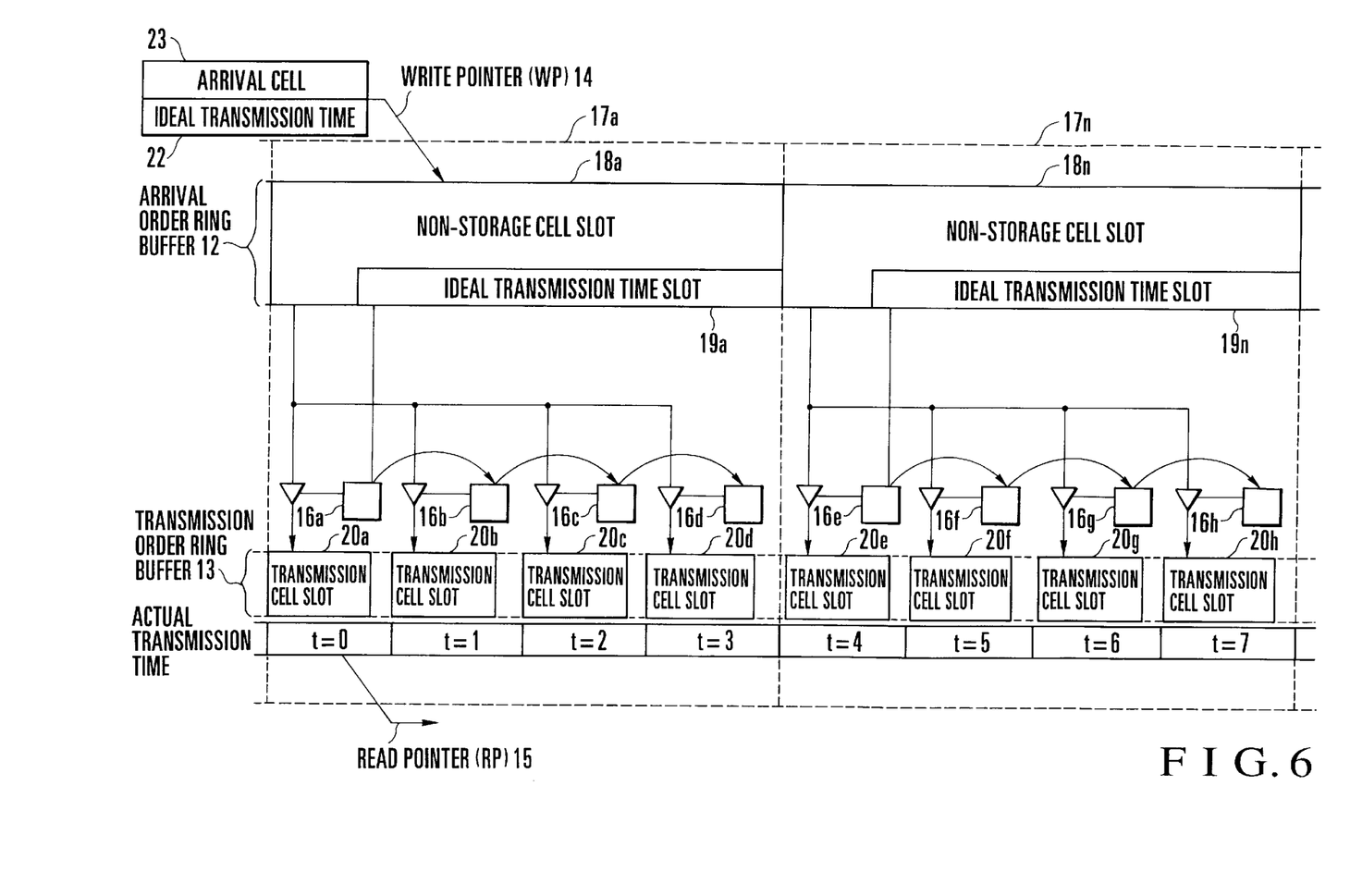
FIG. 6 is a block diagram showing the main part of an output contention control section according to the second embodiment of the present invention.

FIG. 6 shows an output contention control section according to the second embodiment of the present invention. In this embodiment, the output contention control cell memory 6 shown in FIG. 5 which is designed to store the contents of arrival cells in an arrival order ring buffer 12 and a transmission order ring buffer 13 will be described. In this embodiment, cell storage addresses are stored in the output contention control cell memory 6 as in the output contention control section 3 in the first embodiment shown in FIG. 1. The same reference numerals in FIG. 6 denote the same parts as in FIG. 2, and a detailed description thereof will be omitted.

For example, a plurality of transmission cell slots (four transmission cell slots 20a to 20d in this case) having different actual transmission times are assigned to a pair of a non-storage cell slot 18a and an ideal transmission time slot 19a, thereby constituting one time slot 17a. An arrival cell 23 is stored in the non-storage cell slot 18a. Note that determining units 16a to 16d are arranged in correspondence with the transmission cell slots 20a to 20d to perform storage determination processing for the non-storage cell slot 18a, the ideal transmission time slot 19a, and the transmission cell slots 20a to 20d.

FIGS. 7A to 7D explain the output contention operation of the output contention control apparatus shown in FIG. 6. The time slot 17a and time slots 17b to 17n include four transmission cell slots each. For example, the four transmission cell slots 20a to 20d are assigned to the non-storage cell slot 18a and the ideal transmission time slot 19a. The time slot 17a is constituted by these slots.

Step S33 and the subsequent steps will be described next, as an output contention control operation, with reference to the flow charts of FIGS. 3A and 3B. The first storage determination processing is performed in step S33 in FIG. 3A. That is, in FIG. 3B, the respective determining units sequentially compare actual transmission times t of the respective transmission cell slots in a time slot with ideal transmission times T, starting from the actual transmission time nearest to the current time, (step S41), and the presence/absence of an available transmission cell slot is checked (step S42).

Figure 7A:
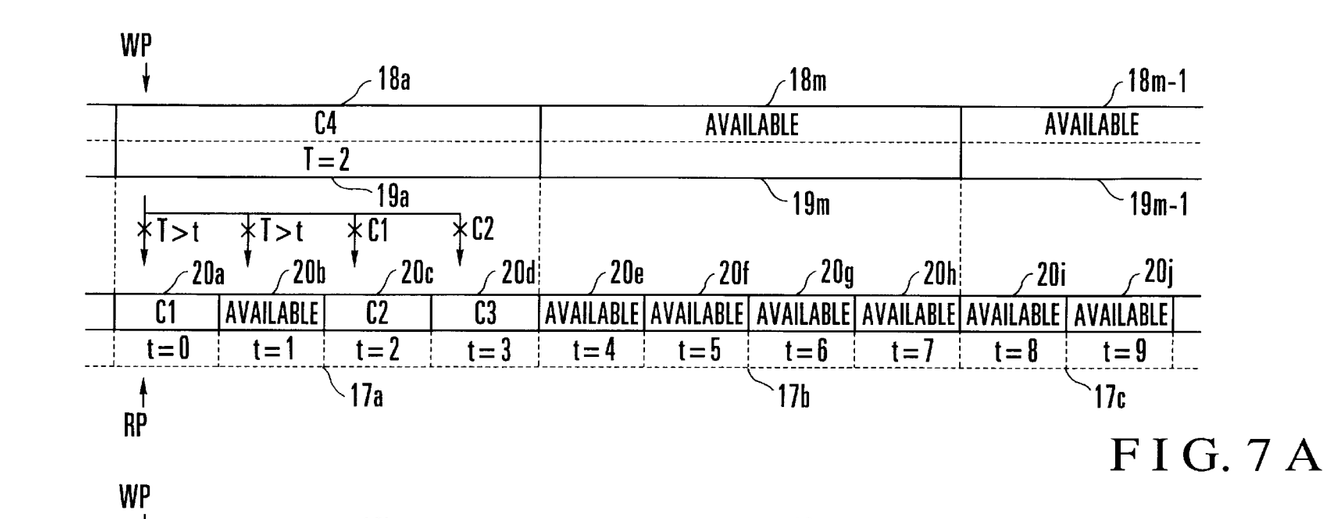
FIGS. 7A to 7D are views showing an output contention operation in the second embodiment of the present invention.

More specifically, in the time slot 17a in FIG. 7A, a new arrival cell "C4" and its ideal transmission time (T=2) are respectively stored in the non-storage cell slot 18a and the ideal transmission time slot 19a on the basis of the write pointer (WP) 14, and storage determination processing with respect to the transmission cell slots 20a to 20d is executed. In this case, storage determination processing is executed first with respect to the transmission cell slot 20a having the actual transmission time nearest to the current time. That is, the actual transmission time t=0 is compared with T=2 in the ideal transmission time slot 19a (step S41).

In this case, since the ideal transmission time T=2 later than the actual transmission time t=0 (T>t), no cell is stored in the transmission cell slot 20a (NO in step S41). Storage determination processing is executed with respect to the transmission cell slot 20b next. Similarly, since the ideal transmission time T=2 is later than the actual transmission time t=1 (T>t), no cell is stored in the transmission cell slot 20b (NO in step S41).

Subsequently, storage determination processing is executed with respect to the transmission cell slot 20c. In this case, although the ideal transmission time T=2 is equal to the actual transmission time t=2 (YES in step S41), a cell "C2" is stored in the transmission cell slot 20c. For this reason, no cell is stored in the transmission cell slot 20c (NO in step S42). Finally, storage determination processing is executed with respect to the transmission cell slot 20d. In this case as well, since a cell "C3" is stored in the transmission cell slot 20d, no cell is stored in the transmission cell slot 20d (NO in step S42).

In this manner, storage determination processing is sequentially executed with respect to the transmission cell slots 20a to 20d of the time slot 17a, starting from the transmission cell slot having the actual transmission time nearest to the current time. Storage determination processing is concurrently executed with respect to the time slots 17a to 17n. Thereafter, all the non-storage cell slots 18a to 18m and ideal transmission time slots 19a to 19m of the arrival order ring buffer 12 are shifted by one slot in the direction of the future of the transmission order ring buffer 13, as shown in FIG. 7B (step S34).

Figure 7B:
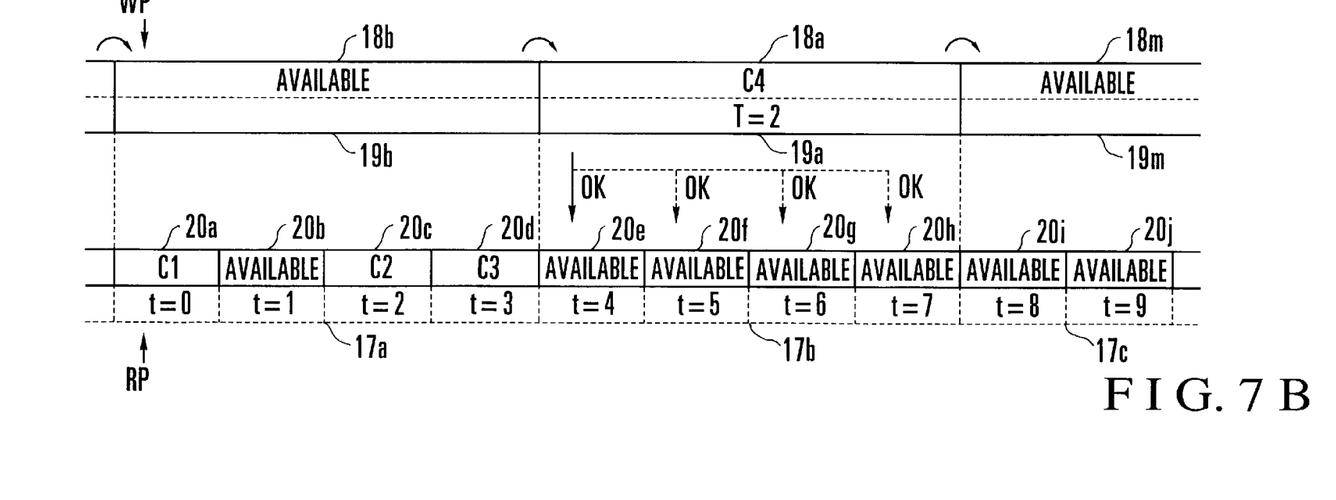

Referring to FIG. 7B, with the slot shift operation of the arrival order ring buffer 12, the new time slot 17b is constituted by the non-storage cell slot 18a, the ideal transmission time slot 19a, and transmission cell slots 20e to 20h. The second storage determination processing in step S33 is then executed. In this case, the ideal transmission time T=2 of the cell "C4" is earlier than the actual transmission time t of each of the transmission cell slots 20e to 20h in the time slot 17b (YES in step S41), and the transmission cell slots 20e to 20h are available (YES in step S42). All the transmission cell slots 20e to 20h therefore satisfy the storage conditions.

In this case, the cell "C4" in the non-storage cell slot 18a is transferred to the transmission cell slot 20e having the actual transmission time nearest to the current time (step S43). Thereafter, all the non-storage cell slots 18a to 18m and ideal transmission time slots 19a to 19m of the arrival order ring buffer 12 are shifted by one slot in the direction of the future of the transmission order ring buffer 13 (step S34).

In the above manner, the storage determination processing (step S33) with respect to the transmission order ring buffer and the slot shift operation (step S34) of the arrival order ring buffer 12 are repeatedly executed twice within a 1-cell time until the next arrival cell is input. FIG. 7 shows the resultant state. As a result, a cell "C1" is read out from the transmission cell slot 20a indicated by a read pointer (RP) 15.

Figure 7C:
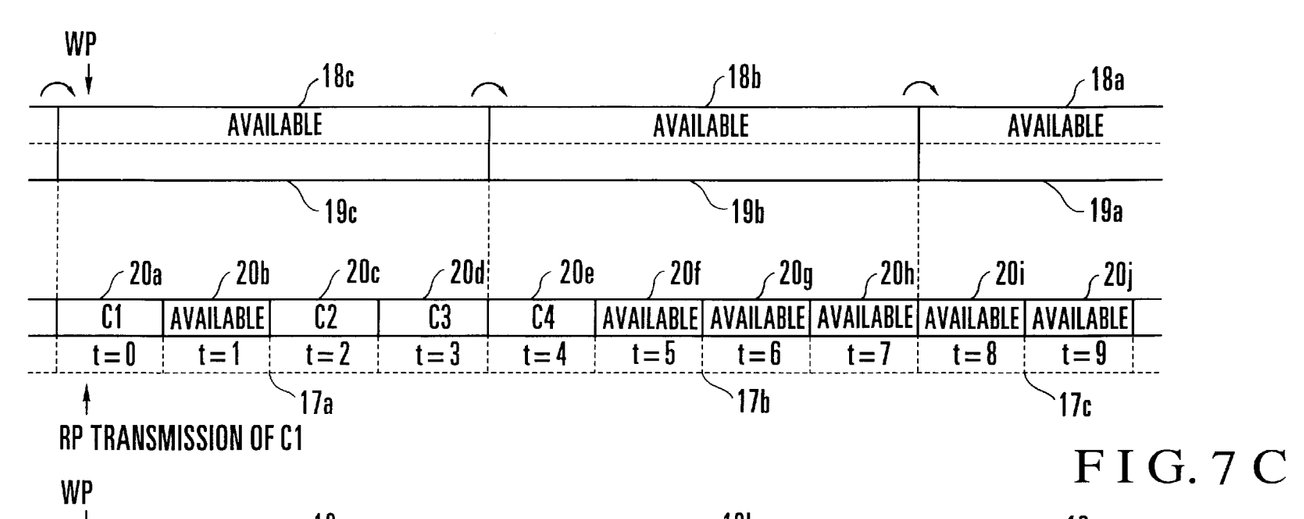
Figure 7D:
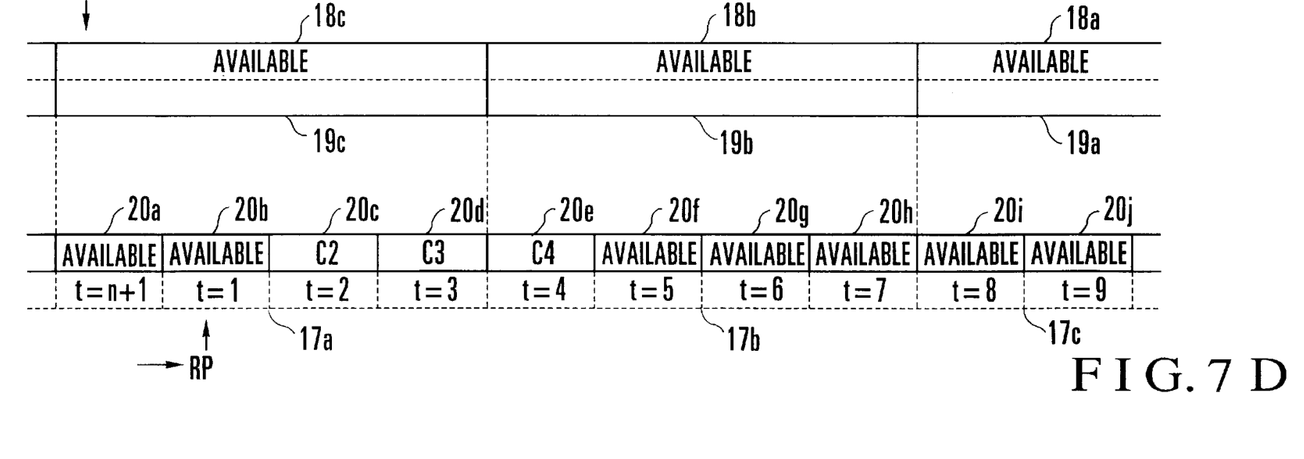

FIG. 7C shows the resultant state. As a result, the cell "C1" is read out and transmitted from the transmission cell slot 20a indicated by the read pointer (RP) 15. Finally, as shown in FIG. 7D, the read pointer 15 is advanced by one slot in the direction of the future, and the actual transmission time of the transmission cell slot 20a which the read pointer 15 has passed is set to a last time slot t=n+1 of the transmission order ring buffer 13.

A write pointer (WP) 14 is advanced in synchronism with the read pointer (RP) 15 only when the read pointer (RP) 15 moves to a different time slot. When the read pointer (RP) 15 indicates the same time slot, the write pointer (WP) 14 is not advanced to the next time slot. In this manner, the output contention control processing for the new arrival cell "C4" is terminated.

In a time slot which is not indicated by the read pointer (RP) 15, storage determination processing is executed with respect to all the transmission cell slots in the time slot. In the time slot which is indicated by the read pointer (RP) 15, storage determination processing is executed with respect to the transmission cell slots having actual transmission times later than the current time. For example, with respect to a new arrival cell immediately after the state shown in FIG. 7D, since the actual transmission time of the transmission cell slot 20a is set to be later than the current time, storage determination processing is performed with respect to the transmission cell slots 20b to 20d in the time slot 17a.

In the time slot which is indicated by the read pointer (RP) 15, when storage determination processing is to be performed for cells other than a new arrival cell, i.e., cells held in the past are subjected to storage determination processing after the shift operation of the arrival order ring buffer 12, the transmission cell slots located earlier than the time indicated by the read pointer (RP) 15 are subjected to storage determination processing. For example, as shown in FIG. 7D, even if the read pointer (RP) 15 indicates the transmission cell slot 20b, when a cell other than a new arrival cell is stored in the non-storage cell slot 18c, the transmission cell slot 20a located earlier than the time indicated by the read pointer (RP) 15.

According to this embodiment, a plurality of transmission cell slots having consecutive actual transmission times are arranged in correspondence with a pair of non-storage cell slot and an ideal transmission time slot, and storage determination processing is started from the transmission cell slot having the actual transmission time nearest to the current time. Therefore, the number of non-storage cell slots can be reduced as compared with the number of transmission cell slots, and the storage capacity of the arrival order ring buffer 12 can be reduced.

In the above description, storage determination processing with respect to the transmission cell slots in each time slot is started from the transmission cell slot having the actual transmission time nearest to the current time. However, the present invention is not limited to this. For example, storage determination with respect to the transmission cell slots in each time slot may be concurrently executed, and the contents of a non-storage cell slot may be transferred to the transmission cell slot having the actual transmission time nearest to the current time. In this case, the processing time can be shortened as compared with the case wherein storage determination processing is started from the transmission cell slot having the actual transmission time nearest to the current time.

As has been described above, according to the present invention, even if the transmission rate of cells is high or the capacity of a transmission order management buffer is large, the search range within a 1-cell time between the arrival of a cell and the arrival of the next cell can be greatly narrowed, as compared with the prior art in which time slots are sequentially searched in the direction of the future from a search start slot to find an available time slot in which an arrival cell is to be stored. With this operation, an available time slot for an arrival cell can be reliably search out regardless of the transmission rate of cells and the capacity of the transmission order management buffer.

In a single time slot, if a given transmission cell slot has an actual transmission time earlier than an ideal transmission time and is available, the contents of a non-storage cell slot are transferred to the transmission cell slot. With this operation, cells can be accurately transmitted in the order of the ideal transmission times assigned to the respective arrival cells.

If a transmission cell slot corresponding to the actual transmission time at which a next cell is to be transmitted is available, and the ideal transmission time of the new arrival cell is earlier than the actual transmission time, the new arrival cell can be immediately transmitted at the next actual transmission time. Therefore, processing response to the new arrival cell can be quickly executed, and the number of queued arrival cells can be reduced.

In addition, since a time slot is constituted by a plurality of transmission cell slots, and storage determination processing is started from the transmission cell slot having the actual transmission time nearest to the current time, the number of non-storage cell slots can be reduced as compared with the number of transmission cell slots, and the storage capacity of the arrival order ring buffer can be reduced.

What is claimed is:

1. A cell output contention control apparatus for a traffic shaper, comprising:

a first ring buffer including a plurality of first slots in which cells or cell storage addresses thereof are stored in an order in which the cells arrive, and a plurality of second slots which are correlated with the first slots and used to store ideal transmission times of the cells;

a second buffer including a plurality of third slots in which cells to be transmitted at the respective actual transmission times sequentially assigned to the slots in advance or cell storage addresses of the cells are stored;

a plurality of time slots each constituted by a set of the first and second slots of said first ring buffer and one of the third slots of said second ring buffer such that a combination of the first and second slots is changed at least once within a 1-cell time; and a plurality of determining means, arranged in correspondence with the respective time slots, for determining whether predetermined storage conditions including an ideal transmission time of a cell are satisfied, and transferring the cell stored in the first slot to the third slot to store the cell therein when the storage conditions are satisfied.

2. An apparatus according to claim 1, wherein said determining means transfers contents of the first slot to the third slot when all the storage conditions are satisfied, the storage conditions including a first condition that an ideal transmission time stored in the second slot is earlier than an actual transmission time assigned to the third slot in the same time slot, and a second condition that the third slot is available.

3. An apparatus according to claim 1, wherein the time slot comprises a combination of a set of the first and second slots, which are earlier than a reference time slot, and the third slot later than the reference time slot, the reference time slot being constituted by a set of the first slot, in which a new arrival cell or a cell storage address thereof is stored, and the second slot, and the third slot to which an actual transmission time indicating a next cell transmission timing is assigned.

4. An apparatus according to claim 3, wherein the first and second slots are shifted with respect to the third slot twice in the direction of the past within a 1-cell time to change the combination of the set of the first and second slots and the third slot which constitute the time slot, and said determining means performs cell storage determination processing every time the combination of the set of the first and second slots and the third slot is changed.

5. An apparatus according to claim 4, further comprising:

a read pointer which is advanced by one slot in the direction of the future of the third slots at 1-cell time intervals to designate one of the third slots from which a cell is to be read out; and a write pointer which is advanced by one slot in the direction of the past of the first slots in synchronism with said read pointer to designate one of the first slots in which an arrival cell is to be written.

6. An apparatus according to claim 5, further comprising:

storage means for storing one of an arrival cell and cell storage data in the first slot in accordance with said write pointer;

shift means for shifting the first slot with respect to the third slot in the direction of the future in association with determination processing performed by said determining means; and read means for reading out one of a cell and a cell storage address stored in the third slot at every actual transmission time in accordance with said read pointer, and wherein one of each readout cell or each cell stored at each readout cell storage address is transmitted onto a virtual path/channel set on an ATM transmission line with transmission intervals being averaged.

7. An apparatus according to claim 1, wherein each of the third slots comprises a plurality of fourth slots having consecutive actual transmission times, and said determining means sequentially performs cell storage determination processing from the fourth slot having the actual transmission time nearest to the current time.

8. An apparatus according to claim 7, wherein said determining means comprises a plurality of determining units arranged in correspondence with the fourth slots.

9. An apparatus according to claim 7, further comprising:

a read pointer which is advanced by one slot in the direction of the future of the fourth slots at 1-cell time intervals to designate one of the third slots from which a cell is to be read out, and wherein said determining means performs cell storage determining processing with respect to the third slot having the actual transmission time later than the current time in the time slot indicated by said read pointer.

10. An apparatus according to claim 7, further comprising:

a read pointer which is advanced by one slot in the direction of the future of the fourth slots at 1-cell time intervals to designate one of the third slots from which a cell is to be read out, and wherein said determining means performs cell storage determination processing with respect to the third slot earlier than a time indicated by said read pointer when a past cell is stored in the first time slot in the time slot indicated by said read pointer.

11. An apparatus according to claim 1, further comprising:

a cell memory for temporarily storing an arrival cell; and time determining means for determining an ideal transmission time of a cell on the basis of header data added to the cell, and wherein a cell storage address of a cell stored in said cell memory is stored in the first slot, and a cell is read out from said cell memory in accordance with a cell storage address read out from the third slot.

* * * * *